United States Patent
Tan et al.

(10) Patent No.: US 10,969,219 B2
(45) Date of Patent: Apr. 6, 2021

(54) SCANNING SYSTEM AND SCANNING METHOD

(71) Applicant: QISDA CORPORATION, Taoyuan (TW)

(72) Inventors: Ming-Che Tan, Taipei (TW); Tsung-Hsi Lee, Tainan (TW)

(73) Assignee: Qisda Corporation, Taoyuan (TW)

( * ) Notice: Subject to any disclaimer, the term of this patent is extended or adjusted under 35 U.S.C. 154(b) by 50 days.

(21) Appl. No.: 16/411,077

(22) Filed: May 13, 2019

(65) Prior Publication Data

US 2020/0240773 A1 Jul. 30, 2020

(30) Foreign Application Priority Data

Jan. 28, 2019 (CN) .......... 201910077475.3

(51) Int. Cl.
| | |
|---|---|
| *G01B 11/25* | (2006.01) |
| *G06K 9/36* | (2006.01) |
| *G06T 7/50* | (2017.01) |
| *H04N 1/00* | (2006.01) |

(52) U.S. Cl.
CPC ............ *G01B 11/2518* (2013.01); *G06K 9/36* (2013.01); *G06T 7/50* (2017.01); *H04N 1/00135* (2013.01); *G06K 2209/40* (2013.01); *G06T 2207/10028* (2013.01)

(58) Field of Classification Search
CPC .................. G01B 11/2518; G06T 7/50; G06T 2207/10028; G06K 9/36; G06K 2209/40; H04N 1/00135

See application file for complete search history.

(56) References Cited

U.S. PATENT DOCUMENTS

| | | | |
|---|---|---|---|
| 10,248,883 B2 * | 4/2019 | Borovinskih | ............. G06T 7/32 |
| 10,813,727 B2 * | 10/2020 | Sabina | ............... A61B 1/00172 |
| 2011/0276159 A1 * | 11/2011 | Chun | ..................... B33Y 50/00 700/98 |
| 2013/0337400 A1 * | 12/2013 | Yi | ............................ A61B 6/14 433/25 |
| 2014/0379356 A1 * | 12/2014 | Sachdeva | ............... A61C 7/002 705/2 |
| 2016/0220173 A1 * | 8/2016 | Ribnick | ............... A61B 5/0062 |
| 2018/0005371 A1 * | 1/2018 | Sabina | ...................... G06T 7/11 |
| 2018/0168781 A1 * | 6/2018 | Kopelman | ............. A61B 90/36 |

(Continued)

*Primary Examiner* — Utpal D Shah

(57) ABSTRACT

A scanning system includes a scanner and a host device. The host device is operated to select a scanning region. An object exists in the scanning region. The host device provides a predicted model corresponding to the object. The predicted model has at least one first characteristic parameter. The scanner scans the object and transmits a plurality of scanned images to the host device. The host device integrates the scanned images into a temporary image. The temporary image has at least one second characteristic parameter. The host device determines whether the second characteristic parameter matches with the first characteristic parameter. When the host device determines that the second characteristic parameter matches with the first characteristic parameter, the host device retains the temporary image. When the host device determines that the second characteristic parameter does not match with the first characteristic parameter, the host device abandons the temporary image.

14 Claims, 4 Drawing Sheets

(56) References Cited

U.S. PATENT DOCUMENTS

| | | | |
|---|---|---|---|
| 2019/0147648 A1* | 5/2019 | Wolff | B33Y 50/02 |
| | | | 433/213 |
| 2019/0231492 A1* | 8/2019 | Sabina | G06T 19/00 |
| 2019/0269482 A1* | 9/2019 | Shanjani | G06F 3/013 |
| 2019/0269485 A1* | 9/2019 | Elbaz | A61B 5/0059 |

* cited by examiner

SCANNING SYSTEM AND SCANNING METHOD

BACKGROUND OF THE INVENTION

1. Field of the Invention

The invention relates to a scanning system and a scanning method and, more particularly, to a scanning system and a scanning method capable of reducing an occurrence probability of a re-scanning process effectively.

2. Description of the Prior Art

An intraoral scanner uses structured light, laser, or other optical scanning techniques to scan tooth rapidly and then transmits the scanned image to a computer, so as to establish a tooth model. In general, due to limitations of structure or operation, the tooth model cannot be established completely through one single scanning process. Accordingly, an operator has to use the intraoral scanner to perform a re-scanning process for tooth, so as to re-model an abnormal stitching area (e.g. distortion or deformation due to unexpected stitching segment) in the tooth model. Accordingly, the tooth model cannot be established efficiently.

SUMMARY OF THE INVENTION

An objective of the invention is to provide a scanning system and a scanning method capable of reducing an occurrence probability of a re-scanning process effectively.

According to an embodiment of the invention, a scanning system comprises a scanner and a host device, wherein the host device communicates with the scanner. The host device is operated to select a scanning region and an object exists in the scanning region. The host device provides a predicted model corresponding to the object and the predicted model has at least one first characteristic parameter. The scanner scans the object and transmits a plurality of scanned images of the object to the host device. The host device integrates the scanned images into a temporary image and the temporary image has at least one second characteristic parameter. The host device determines whether the at least one second characteristic parameter matches with the at least one first characteristic parameter. When the host device determines that the at least one second characteristic parameter matches with the at least one first characteristic parameter, the host device retains the temporary image. When the host device determines that the at least one second characteristic parameter does not match with the at least one first characteristic parameter, the host device abandons the temporary image.

According to another embodiment of the invention, a scanning method comprises steps of selecting a scanning region, wherein an object exists in the scanning region; providing a predicted model corresponding to the object, wherein the predicted model has at least one first characteristic parameter; scanning the object to generate a plurality of scanned images of the object; integrating the scanned images into a temporary image, wherein the temporary image has at least one second characteristic parameter; determining whether the at least one second characteristic parameter matches with the at least one first characteristic parameter; when the at least one second characteristic parameter matches with the at least one first characteristic parameter, retaining the temporary image; and when the at least one second characteristic parameter does not match with the at least one first characteristic parameter, abandoning the temporary image.

As mentioned in the above, after selecting the scanning region, the invention provides the predicted model corresponding to the object in the scanning region. Then, the invention integrates the scanned images of the object into the temporary image and utilizes the predicted model to determine that the temporary image is normal or abnormal. When the temporary image is normal (i.e. the characteristic parameter of the temporary matches with the characteristic parameter of the predicted model), the invention retains the temporary image for establishing a 3D model corresponding to the object. When the temporary image is abnormal (i.e. the characteristic parameter of the temporary does not match with the characteristic parameter of the predicted model), the invention abandons the temporary image, so as to prevent an abnormal stitching area (e.g. distortion or deformation due to unexpected stitching segment) from appearing on the 3D model. Accordingly, the invention can reduce an occurrence probability of a re-scanning process effectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
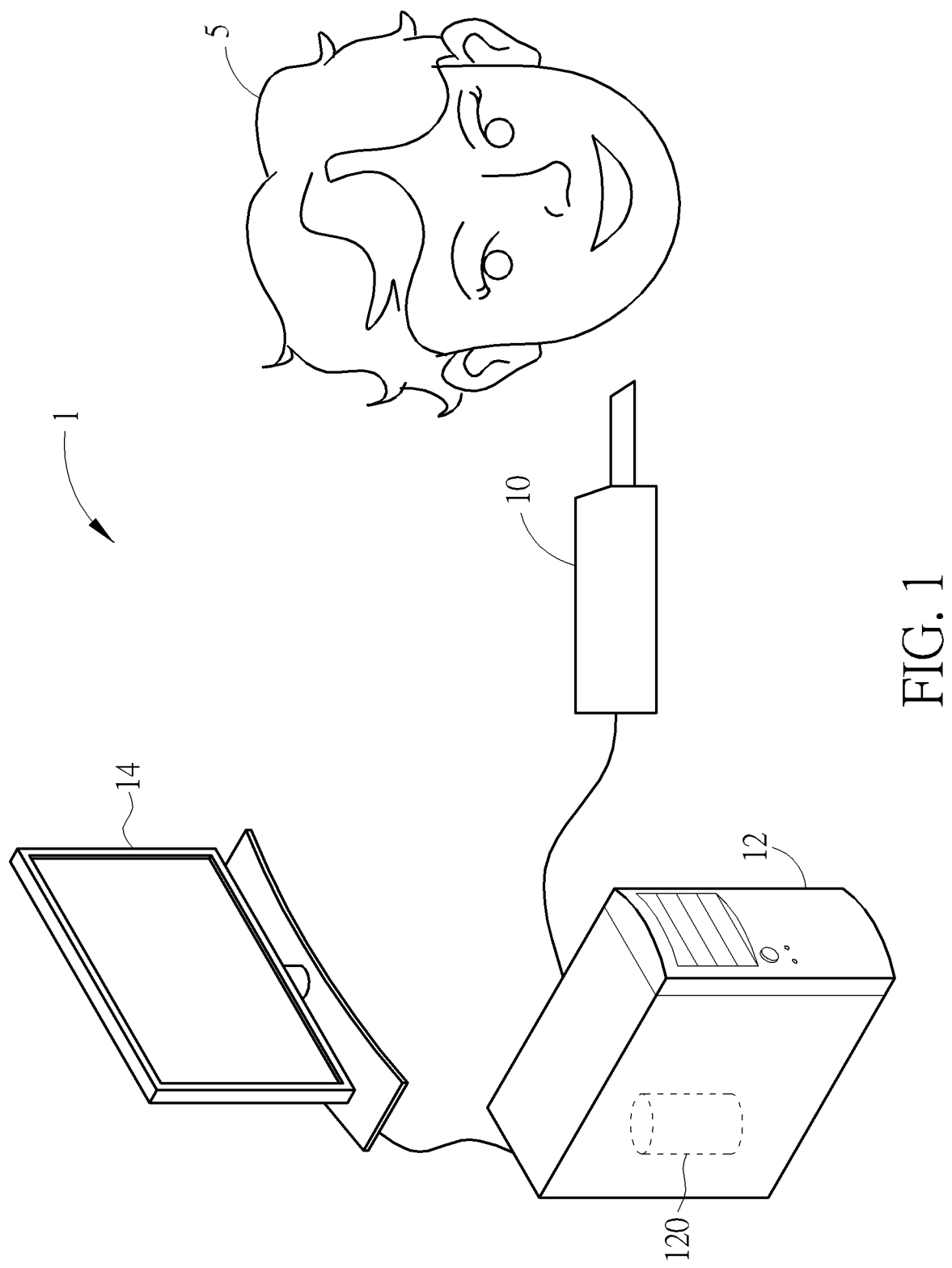
FIG. 1 is a schematic diagram illustrating a scanning system according to an embodiment of the invention.
Figure 2:
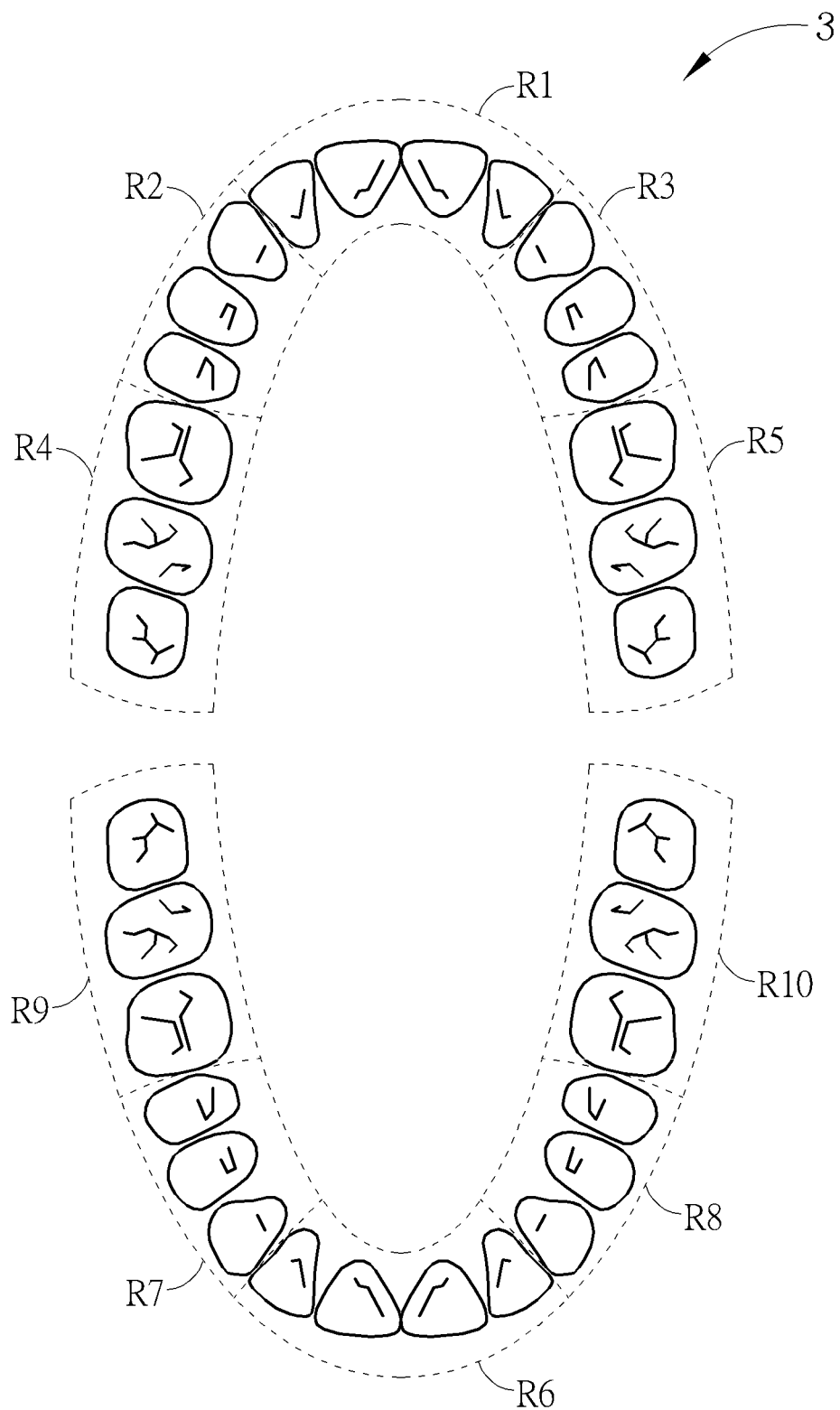
FIG. 2 is a schematic diagram illustrating an object according to an embodiment of the invention.
Figure 3:
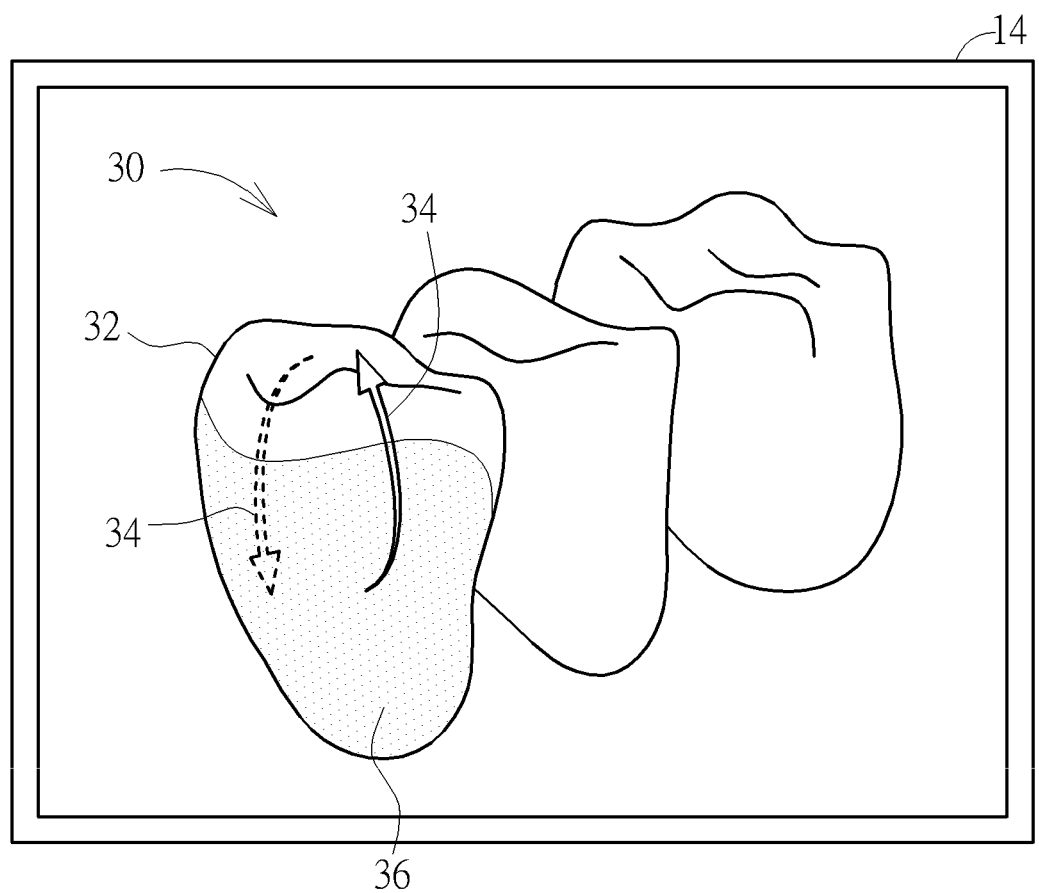
FIG. 3 is a schematic diagram illustrating a display device displaying a 3D contour of a predicted model.

Referring to FIGS. 1 to 3, FIG. 1 is a schematic diagram illustrating a scanning system 1 according to an embodiment of the invention, FIG. 2 is a schematic diagram illustrating an object 3 according to an embodiment of the invention, and FIG. 3 is a schematic diagram illustrating a display device 14 displaying a 3D contour 32 of a predicted model 30.

As shown in FIG. 1, the scanning system 1 comprises a scanner 10, a host device 12 and a display device 14, wherein the host device communicates with the scanner 10 and the display device 14 communicates with the host device 12. In this embodiment, the scanner 10 may be, but not limited to, an intraoral scanner and the host device 12 may be, but not limited to, a computer. The scanning system 1 may be used to scan an object 3 shown in FIG. 2 to establish a 3D model corresponding to the object 3. The object 3 shown in FIG. 2 is exemplified by teeth of a patient 5 shown in FIG. 1 according to an embodiment of the invention. However, the object 3 is not limited to teeth and may be determined according to practical applications. As shown in FIG. 2, the object 3 may be divided into a plurality of scanning regions R1-R10 in advance, wherein each of the scanning regions R1-R10 may comprise one or more teeth according to practical applications.

When an operator wants to use the scanning system 1 to establish a 3D model corresponding to the object 3, the operator has to operate the host device 12 to select a scanning region first. For example, the operator may operate the host device 12 to select the scanning region R5, wherein a part of the object 3 (e.g. a plurality of teeth) exists in the scanning region R5. Then, the host device 12 provides a predicted model 30 corresponding to the object 3 in the scanning region R5, as shown in FIG. 3. In this embodiment, the predicted model 30 may have a 3D contour 32. Accordingly, when the host device 12 is operated to select the scanning region R5, the host device 12 may display the 3D contour 32 of the predicted model 30 in the display device 14.

In this embodiment, the host device 12 may store a database 120 established in advance, wherein the database 120 records a plurality of reference models. The invention may record the 3D models of the teeth of all previous patients in the database 120 to be served as the reference models. Accordingly, the host device 12 may obtain the predicted model 30 according to at least one of the reference models. For example, when the object 3 in the scanning region R5 is a molar tooth, the host device 12 may perform calculation (e.g. average, median, etc.) for the data of the 3D models of all molar teeth in the database 120, so as to obtain the predicted model 30 corresponding to the object 3. It should be noted that if the database 120 had recorded the 3D model of the teeth of the patient 5 established previously, the host device 12 may take the 3D model of the teeth of the patient 5 established previously to be the predicted model 30 directly.

In this embodiment, after selecting the scanning region R5, the host device 12 may be selectively operated to select a current state of the object 3 (e.g. normal tooth or abnormal decayed tooth). Furthermore, the reference models in the database 120 may be classified into different states (e.g. normal tooth or abnormal decayed tooth). Accordingly, the host device may select at least one reference model matching with the current state of the object 3 from the reference models and obtain the predicted model 30 according to the at least one reference model. Since the predicted model 30 is obtained by matching with the current state of the object 3, the following data comparison will be more accurate.

In this embodiment, the invention may define a corresponding scanning path for the object in each of the scanning regions in advance. Accordingly, when the host device 12 is operated to select the scanning region R5, the host device 12 may display a scanning path 34 on the 3D contour 32, as shown in FIG. 3. Therefore, the operator can operate the scanner 10 to scan the object 3 along the scanning path 34, so as to obtain the scanned images of the object 3 successfully.

In this embodiment, the predicted model 30 has at least one first characteristic parameter (e.g. occlusion area, shape, texture, size, etc.). After the scanner 10 scans the object 3, the scanner 10 transmits a plurality of scanned images of the object 3 to the host device 12. Then, the host device 12 integrates the scanned images into a temporary image, wherein the temporary image also has at least one second characteristic parameter (e.g. occlusion area, shape, texture, size, etc.). Then, the host device 12 compares the temporary image with the predicted model 30 to determine whether the second characteristic parameter of the temporary image matches with the first characteristic parameter of the predicted model 30. For example, the host device 12 may determine whether the second characteristic parameter of the temporary image matches with the first characteristic parameter of the predicted model 30 according to a difference between the second characteristic parameter of the temporary image and the first characteristic parameter of the predicted model 30. When the difference between the second characteristic parameter of the temporary image and the first characteristic parameter of the predicted model 30 is smaller than or equal to a predetermined threshold, the host device 12 may determine that the second characteristic parameter of the temporary image matches with the first characteristic parameter of the predicted model 30. On the other hand, when the difference between the second characteristic parameter of the temporary image and the first characteristic parameter of the predicted model 30 is larger than the predetermined threshold, the host device 12 may determine that the second characteristic parameter of the temporary image does not match with the first characteristic parameter of the predicted model 30.

When the host device 12 determines that the second characteristic parameter of the temporary image matches with the first characteristic parameter of the predicted model 30, it means that the temporary image is normal. At this time, the host device retains the temporary image for establishing a 3D model corresponding to the object. On the other hand, when the host device 12 determines that the second characteristic parameter of the temporary image does not match with the first characteristic parameter of the predicted model 30, it means that the temporary image may be abnormal due to improper operation. At this time, the host device 12 abandons the temporary image, so as to prevent an abnormal stitching area (e.g. distortion or deformation due to unexpected stitching segment) from appearing on the 3D model. As shown in FIG. 3, when the host device 12 retains the temporary image 36, the host device 12 may display the temporary image 36 on the 3D contour 32, such that the operator can control current scanning progress anytime.

After completing the scanning process, the operator may operate the scanner 10 to send out a complete command (e.g. press a stop button). When the host device 12 receives the complete command, the host device 12 will use a plurality of retained temporary images 36 to establish a 3D model corresponding to the object 3. It should be noted that the complete command may also be generated automatically after the host device 12 determines that the scanning process has been completed. For example, when the predicted model 30 has been fully filled with the temporary images 36, the host device 12 may determine that the scanning process has been completed and then generate the complete command. Furthermore, after establishing the 3D model corresponding to the object 3, the host device 12 may add the 3D model into the reference models of the database 120 to be served as a basis for generating the predicted model in next scanning process.

Figure 4:
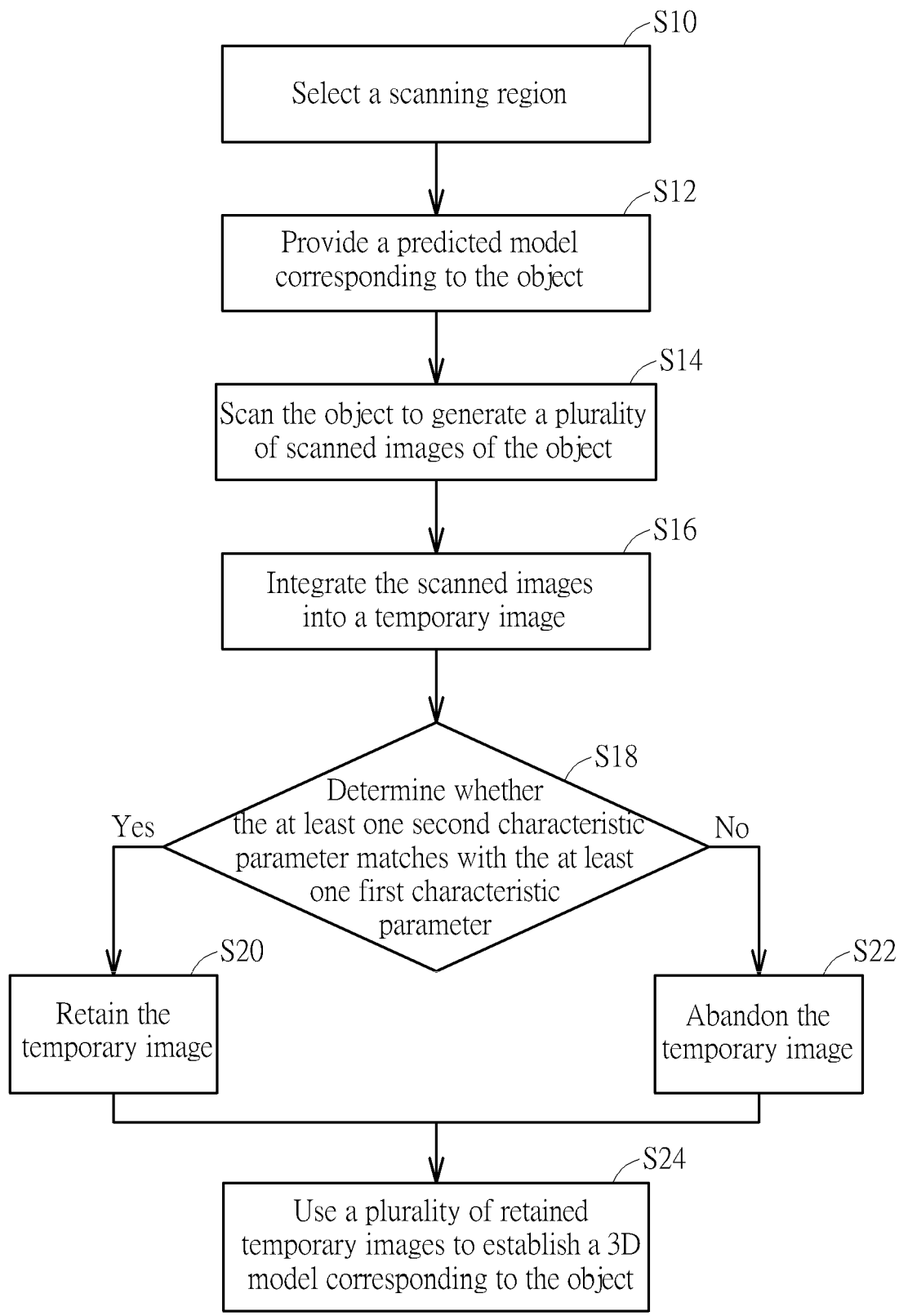
FIG. 4 is a flowchart illustrating a scanning method according to an embodiment of the invention.

Referring to FIG. 4, FIG. 4 is a flowchart illustrating a scanning method according to an embodiment of the invention. The scanning method shown in FIG. 4 can be implemented by the aforesaid scanning system 1. First, step S10 is performed to select a scanning region R5, wherein an object 3 exists in the scanning region R5. Then, step S12 is performed to provide a predicted model 30 corresponding to the object 3, wherein the predicted model 30 has at least one first characteristic parameter. When selecting the scanning region R5, the scanning method of the invention may selectively display a 3D contour 32 of the predicted model 30 and/or display a scanning path 34 on the 3D contour 32. Then, step S14 is performed to scan the object 3 to generate a plurality of scanned images of the object 3. Then, step S16 is performed to integrate the scanned images into a temporary image 36, wherein the temporary image 36 has at least one second characteristic parameter. Then, step S18 is performed to determine whether the at least one second characteristic parameter matches with the at least one first characteristic parameter. When the at least one second characteristic parameter matches with the at least one first characteristic parameter, step S20 is performed to retain the temporary image 36. When the at least one second characteristic parameter does not match with the at least one first characteristic parameter, step S22 is performed to abandon the temporary image 36. Finally, step S24 is performed to use a plurality of retained temporary images 36 to establish a 3D model corresponding to the object 3.

It should be noted that the detailed embodiments of the scanning method of the invention are mentioned in the above and those will not be depicted herein again. Furthermore, each part or function of the control logic of the scanning method shown in FIG. 4 may be implemented by a combination of software and hardware.

As mentioned in the above, after selecting the scanning region, the invention provides the predicted model corresponding to the object in the scanning region. Then, the invention integrates the scanned images of the object into the temporary image and utilizes the predicted model to determine that the temporary image is normal or abnormal. When the temporary image is normal (i.e. the characteristic parameter of the temporary matches with the characteristic parameter of the predicted model), the invention retains the temporary image for establishing a 3D model corresponding to the object. When the temporary image is abnormal (i.e. the characteristic parameter of the temporary does not match with the characteristic parameter of the predicted model), the invention abandons the temporary image, so as to prevent an abnormal stitching area (e.g. distortion or deformation due to unexpected stitching segment) from appearing on the 3D model. Accordingly, the invention can reduce an occurrence probability of a re-scanning process effectively. Furthermore, the invention may display the 3D contour of the predicted model in the display device and display the scanning path on the 3D contour, so as to assist the operator in scanning. Still further, the invention may display the temporary image on the 3D contour, such that the operator can control the scanning progress anytime. Moreover, after establishing the 3D model corresponding to the object, the invention may add the 3D model into the reference models of the database to be served as a basis for generating the predicted model in next scanning process.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A scanning system comprising:
    a scanner;
    a host device communicating with the scanner; and
    a display device communicating with the host device;
    wherein when the host device is operated to select a scanning region and an object exists in the scanning region, the host device displays a 3D contour in the display device; the host device provides a predicted model corresponding to the object and the predicted model has at least one first characteristic parameter and the 3D contour; the scanner scans the object and transmits a plurality of scanned images of the object to the host device; the host device integrates the scanned images into a temporary image and the temporary image has at least one second characteristic parameter; the host device determines whether the at least one second characteristic parameter matches with the at least one first characteristic parameter; when the host device determines that the at least one second characteristic parameter matches with the at least one first characteristic parameter, the host device retains the temporary image and the host device displays the temporary image on the 3D contour in the display device to show a current scanning progress for the object in the scanning region; when the host device determines that the at least one second characteristic parameter does not match with the at least one first characteristic parameter, the host device abandons the temporary image.

2. The scanning system of claim 1, wherein when the host device is operated to select the scanning region, the host device displays a scanning path on the 3D contour.

3. The scanning system of claim 1, wherein when the host device receives a complete command, the host device uses a plurality of retained temporary images to establish a 3D model corresponding to the object.

4. The scanning system of claim 1, wherein the host device stores a database, the database records a plurality of reference models, and the host device obtains the predicted model according to at least one of the reference models.

5. The scanning system of claim 4, wherein when the host device receives a complete command, the host device uses a plurality of retained temporary images to establish a 3D model corresponding to the object and adds the 3D model into the reference models of the database.

6. The scanning system of claim 1, wherein the host device is operated to select a current state of the object and the predicted model corresponds to the current state of the object.

7. The scanning system of claim 6, wherein the host device stores a database, the database records a plurality of reference models, and the host device selects at least one reference model matching with the current state of the object from the reference models and obtains the predicted model according to the at least one reference model.

8. A scanning method comprising steps of:
    selecting a scanning region, wherein an object exists in the scanning region;
    providing a predicted model corresponding to the object, wherein the predicted model has at least one first characteristic parameter and a 3D contour;
    displaying the 3D contour when selecting the scanning region;
    scanning the object to generate a plurality of scanned images of the object;
    integrating the scanned images into a temporary image, wherein the temporary image has at least one second characteristic parameter;
    determining whether the at least one second characteristic parameter matches with the at least one first characteristic parameter;
    when the at least one second characteristic parameter matches with the at least one first characteristic parameter, retaining the temporary image and displaying the temporary image on the 3D contour to show a current scanning progress for the object in the scanning region; and
    when the at least one second characteristic parameter does not match with the at least one first characteristic parameter, abandoning the temporary image.

9. The scanning method of claim 8, further comprising step of:

when selecting the scanning region, displaying a scanning path on the 3D contour.

10. The scanning method of claim 8, further comprising step of:
using a plurality of retained temporary images to establish a 3D model corresponding to the object.

11. The scanning method of claim 8, further comprising steps of:
establishing a database in advance, wherein the database records a plurality of reference models; and
obtaining the predicted model according to at least one of the reference models.

12. The scanning method of claim 11, further comprising steps of:
using a plurality of retained temporary images to establish a 3D model corresponding to the object; and
adding the 3D model into the reference models of the database.

13. The scanning method of claim 8, further comprising step of:
after selecting the scanning region, selecting a current state of the object, wherein the predicted model corresponds to the current state of the object.

14. The scanning method of claim 13, further comprising steps of:
establishing a database in advance, wherein the database records a plurality of reference models;
selecting at least one reference model matching with the current state of the object from the reference models; and
obtaining the predicted model according to the at least one reference model.

* * * * *